United States Patent [19]

Pink et al.

[11] Patent Number: 4,995,808
[45] Date of Patent: Feb. 26, 1991

[54] CARBON DESORPTION HEATER

[75] Inventors: William B. Pink, Birmingham; William G. Ickes, Warren, both of Mich.

[73] Assignee: Sheet Metal Industries, Inc., Melvindale, Mich.

[21] Appl. No.: 481,981

[22] Filed: Feb. 20, 1990

[51] Int. Cl.⁵ ............................................. F23J 15/00
[52] U.S. Cl. ................................. 432/72; 126/116 R; 126/116 B; 126/99 R
[58] Field of Search .............. 432/72; 55/390; 237/70; 126/99 R, 116 R, 116 B

[56] References Cited

U.S. PATENT DOCUMENTS

| | | | |
|---|---|---|---|
| 3,942,264 | 3/1976 | Zenker | 432/72 X |
| 4,255,132 | 3/1981 | Cathew | 432/72 X |
| 4,460,331 | 7/1984 | Robson et al. | 432/72 |
| 4,475,292 | 10/1984 | Hendricks | 432/72 X |
| 4,669,656 | 6/1987 | Turko | 126/99 R X |
| 4,867,949 | 9/1989 | Betz | 432/72 X |
| 4,895,580 | 1/1990 | Morioka et al. | 55/390 X |

*Primary Examiner*—Henry A. Bennett
*Assistant Examiner*—C. Kilner
*Attorney, Agent, or Firm*—Brooks & Kushman

[57] ABSTRACT

A carbon desorption heater (10) for use in a system for removing volatile organic contaminants from a carbon filter is disclosed as having a housing (30) in which a recirculating heating circuit (36) is provided with a recirculation blower (44) that moves the air past a burner (50) for flow through a first flow path (60) of a heat exchanger (58) with a portion of the recirculated air exhausted during each cycle of flow through an exhaust stack outlet (52). A delivery blower (64) within the housing (30) moves air through a second flow path (62) of the heat exchanger (58) for heating prior to delivery to a supply outlet (34). The heater includes a plurality of modules (90) that are sufficiently small so as to be shippable and subsequently securable to each other at the factory site where the heater is to be used. Insulated walls (94, 96, 98, 100) cooperate to define a heating chamber (106) in which the recirculating heating circuit (36) is located, while an outer wall (108) cooperates with certain of the insulated walls to provide a control chamber (110) in which the control equipment of the heater is located for adjustment and maintenance.

15 Claims, 4 Drawing Sheets

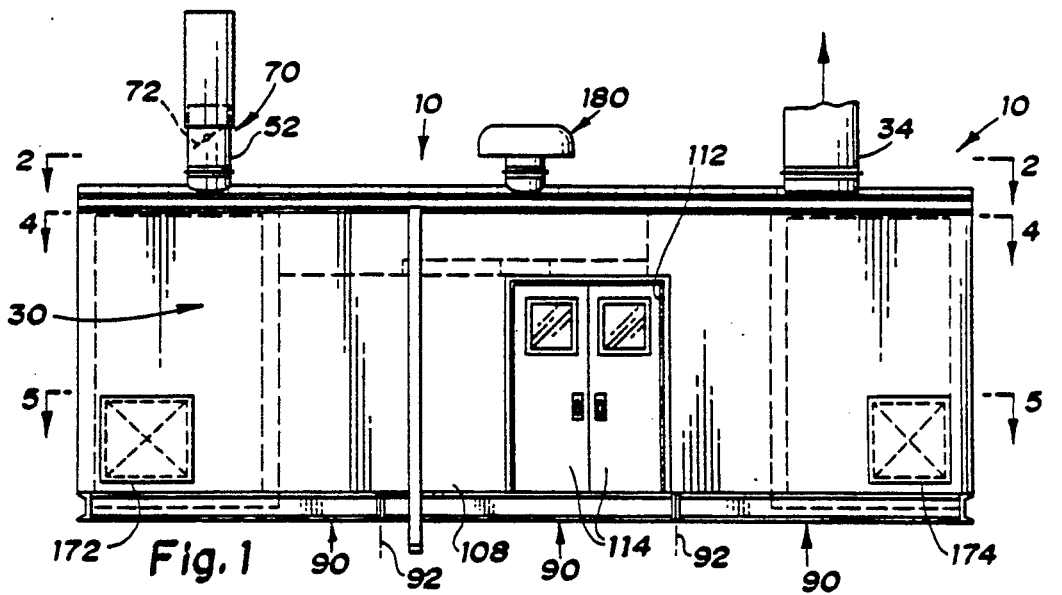
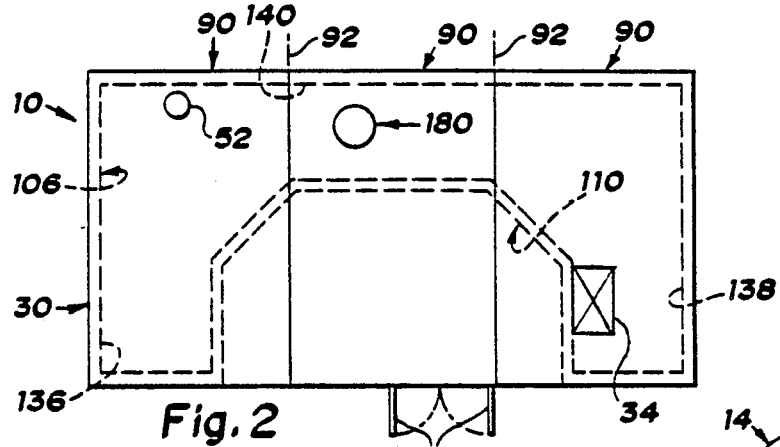
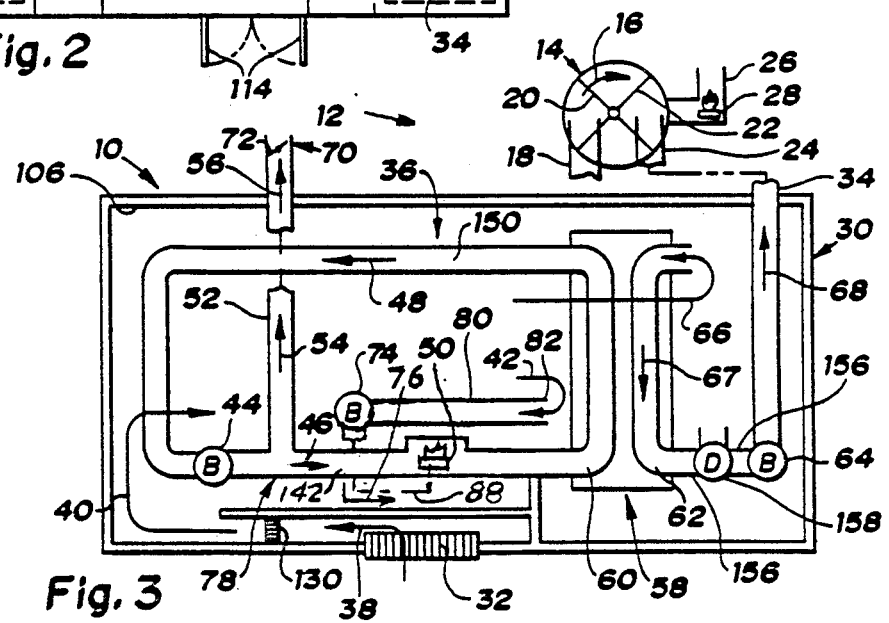

CARBON DESORPTION HEATER

TECHNICAL FIELD

This invention relates to a carbon desorption heater for use in a system for removing volatile organic contaminants from a carbon filter.

BACKGROUND ART

One way of removing volatile organic contaminants from industrial exhaust stack emissions is through the use of a carbon filter that absorbs the volatile organic contaminants prior to passage of the emissions to the atmosphere. Such carbon filters are supplied with heated gas from a carbon desorption heater to remove the volatile organic contaminants from the carbon filter by a desorption process. This type of system is conventionally constructed with the carbon filter as a rotatable wheel that is rotatively driven between emission and desorption partitions spaced angularly from each other so as to provide the removal of contaminants from the emissions during one angular portion of rotation and to provide the desorption of the contaminants by the heated air at another angular portion of the rotation. After passage through the carbon filter, the heated air has a concentration of volatile organic contaminants many times greater than that of the exhaust stack emissions such that the volatile organic contaminants can be more efficiently incinerated prior to passage of the products of combustion to the atmosphere.

Carbon desorption heaters presently used with industrial paint spray booth emissions cleaning are not particularly efficient or easy to use since such heaters are assembled from numerous components at the factory site due to their relatively large size. Such inefficiency and the cost involved in assembly of the heaters at the factory site necessarily must be born by the cost of the resultant painted product.

DISCLOSURE OF INVENTION

An object of the present invention is to provide an improved carbon desorption heater for use in a system for removing volatile organic contaminants from a carbon filter. In carrying out this object, the improved carbon desorption heater has increased efficiency, is easy to use, and is readily fabricated prior to shipment for assembly from a minimal number of modules at the site where the heater is to be used.

The carbon desorption heater of the invention is designed for use in a system for removing volatile organic contaminants from a carbon filter. A housing of the heater has an inlet for receiving air to be heated and has a supply outlet through which heated air is supplied to the carbon filter to provide the removal of volatile organic contaminants. A recirculating heating circuit of the heater is located within the housing and includes a recirculation blower that moves air in a recirculating manner along the heating circuit as well as including a burner that heats the air during its recirculating flow. The heating circuit also includes an exhaust stack outlet through which a portion of the recirculating air is exhausted during each cycle of flow through the heating circuit. A heat exchanger of the heater is located within the housing and has a first flow path that is heated by the recirculating heating circuit. A second flow path of the heat exchanger is heated by heat exchange with the first flow path. A delivery blower of the heater is located within the housing and moves air through the second flow path of the heat exchanger for heating thereof and for supplying the heated air to the supply outlet of the housing for the flow to the carbon filter from which the volatile organic contaminants are received.

Provision of the recirculating heating circuit of the heater provides efficiency in the heating of the air that removes volatile organic contaminants from the carbon filter during the desorption process prior to incineration of contaminated air and eventual passage of the products of such incineration to the atmosphere.

In its preferred construction, the carbon desorption heater also includes a combustion blower that draws air into the heating circuit for combustion at the burner. An inlet conduit of the heating circuit is positioned between the burner and the housing to function as insulation that prevent excessive heating of the housing by the burner, and the combustion blower draws air into the heating circuit through the inlet conduit for combustion at the burner.

Ductwork of the heating circuit preheats the air upon entering the housing prior to moving through the second flow path of the heat exchanger for further heating.

The carbon desorption heater is preferably construction to include a plurality of modules each of which is sufficiently small so as to be shippable by commercial carrier. These modules are securable to each other at the site where the heater is to be used and are also preferably prewired and prepiped to reduce the installation time and cost.

In its preferred construction, the housing of the heater includes insulated walls that define a heating chamber in which the recirculating heating circuit is located. An outer wall of the housing cooperates with the insulated walls to define a control chamber and has an access opening through which the control chamber is accessible to permit maintenance and adjustment of the heater without being subjected to the environment. Each blower of the heater includes a drive motor located within the control chamber such that the motors are not operated at an elevated temperature as would be the case if located within the heating chamber. One of the insulated walls of the housing has an access door for providing access to the heat exchanger from the control chamber. A floor of the control chamber has a grate that embodies the air inlet to the housing, and the housing also includes a control chamber ceiling having a filter through which the air passes upon flow from the inlet through the control chamber into the heating chamber in which the recirculating heating circuit is located.

In its preferred construction, the heating chamber of the heater has a pair of spaced end portions and a connecting portion that connects the end portions to define a generally U-shaped configuration. This U-shaped heating chamber defines a central portion at which the control chamber is located. The recirculating heating circuit of the heater has an L-shaped lower heating reach that extends along one end portion of the heating chamber and the connecting portion, and the burner of the heating circuit is located along this lower heating reach. The heat exchanger of the heater is located at the junction of the other end portion and the connecting portion of the heating chamber with the lower heating reach of the heating circuit extending to the heat exchanger for providing heated gas flow through its first flow path. An L-shaped upper return reach of the heating circuit extends from the heat exchanger along the connecting portion of the heating chamber to its one end portion along which the lower heating reach also extends. At this one end portion of the heating chamber, the heating circuit has a vertical connecting reach that connects the heating and return reaches.

The preferred construction of the carbon desorption heater also has the exhaust stack outlet provided with a connection to the lower heating reach of the heating circuit upstream from the burner and within the one end portion of the heating chamber. The supply outlet and delivery blower of the heater are preferably located at the other end portion of the heating chamber.

Control of the supply of heated air is preferably achieved by a damper that controls the extent of heated air supplied from the second flow path of the heat exchanger to the supply outlet. A vertical outlet duct of the heater extends upwardly from the delivery blower at the other end portion of the heating chamber to the supply outlet through which the heated air is supplied.

The objects, features, and advantages of the present invention are readily apparent from the following detailed description of the best mode for carrying out the invention when taken in connection with the accompanying drawings.

BRIEF DESCRIPTION OF DRAWINGS

FIG. 1 is a front elevational view of a carbon desorption heater constructed in accordance with the present invention;

FIG. 2 is a plan view of the heater taken along the direction of line 2—2 in FIG. 1 and illustrates the modular construction of the heater;

FIG. 3 is a schematic view of a system in which the heater is utilized to remove volatile organic contaminants from a carbon filter;

BEST MODE FOR CARRYING OUT THE INVENTION

Figure 4:
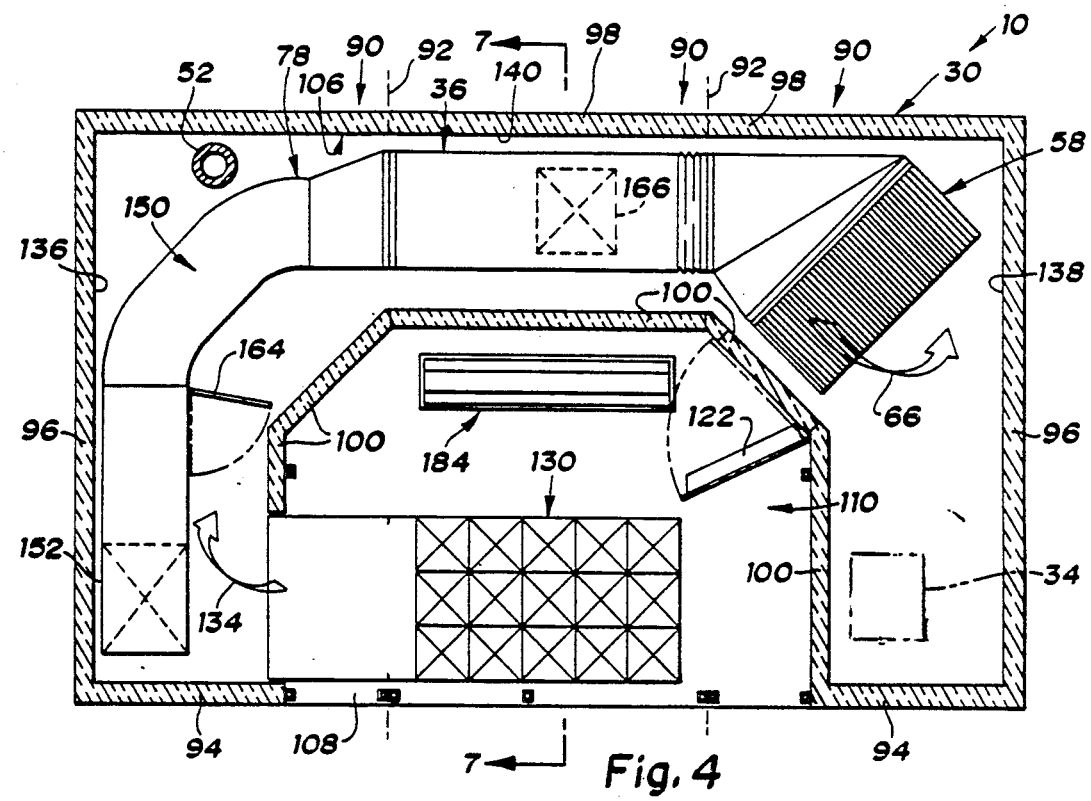
FIG. 4 is a plan view taken in section through the heater along the direction of line 4—4 in FIG. 1 to illustrate the heater construction adjacent its ceiling level.

With reference to FIGS. 1 and 3 of the drawings, a carbon desorption heater constructed in accordance with the present invention is generally identified by 10 and is used in a system 12 shown in FIG. 3 for removing volatile organic contaminants from a carbon filter 14. This carbon filter 14 is rotatively driven as indicated by arrow 16 and receives exhaust stack emissions from an exhaust stack 18 such as of the type used with an industrial paint spray booth for which this heater 10 has particular utility. These emissions from the exhaust stack 18 are received by the rotating carbon filter 14 within a stationary partition 20 such that volatile organic contaminants are removed from the emissions by absorption within the carbon filter. At another stationary partition 22, the carbon filter 14 receives heated air through a supply conduit 24 from the heater 10 so as to remove the volatile organic contaminants from the carbon filter 14 by a desorption process. This heated air passes through the carbon filter 14 and is received by an incineration stack 26 whose burner 28 provides incineration of the volatile organic contaminants prior to passage of the products of combustion to the atmosphere. This type of carbon filter desorption system provides the gases within the stack 26 with a concentration of volatile organic contaminants many times greater than the concentration within the exhaust stack 18 such that the incineration of those contaminants can be accomplished more efficiently than burning within the exhaust stack 18.

As shown by the schematic illustration of FIG. 3, the heater 10 includes a housing 30 having an inlet 32 for receiving air to be heated and also having a supply outlet 34 through which heated air is supplied to the carbon filter through the conduit 24 as previously described. A recirculating heating circuit 36 of the heater is located within the housing 30 and as indicated by arrows 38, 40, and 42 receives combustion air from the housing inlet 32. This heating circuit 36 includes a recirculation blower 44 that moves air as shown by arrows 46 and 48 in a recirculating manner along the heating circuit. A burner 50 of the heating circuit 36 heats the air during this recirculating flow, while an exhaust stack outlet 52 of the heating circuit receives a portion of the recirculating air which is exhausted as shown by arrows 54 and 56 during each cycle of flow through the heating circuit. Heater 10 also includes a heater exchanger 58 having a first flow path 60 that is heated by recirculating heating circuit 36 and having a second flow path 62 that is heated by heat exchange with the first flow path through any conventional type heat exchanger construction. A delivery blower 64 of the heater moves air as shown by arrows 66 and 67 into and through the second flow path 62 of the heat exchanger 58 for heating thereof and for supplying the heated air as shown by arrow 68 to the supply outlet 34 of the housing.

Recirculation of the gas within the heating circuit 36 provides efficiency in the heating of the gas supplied to the outlet 34 since heat that is not exchanged through the indirect heat exchange process within the heat exchanger 58 after passage through its first flow path 60 is not completely wasted by passage to the exhaust stack outlet 52 as with conventional carbon desorption heaters. Rather, almost all of this heat is recouped by the recirculation of the air within the heating circuit 36 as shown by arrows 46 and 48 back to the burner 50. The extent to which the gas is exhausted from the heating circuit 36 is governed by a control 70 that is preferably embodied by a damper 72 within the exhaust stack outlet 52 as shown in both FIGS. 1 and 3. The fresh air drawn into the heating circuit 36 during each cycle, as illustrated by arrow 42 and as is hereinafter more fully described, replaces the air exhausted through outlet 52 such that the recirculating flow does not become excessively concentrated with the products of combustion.

Figure 5:
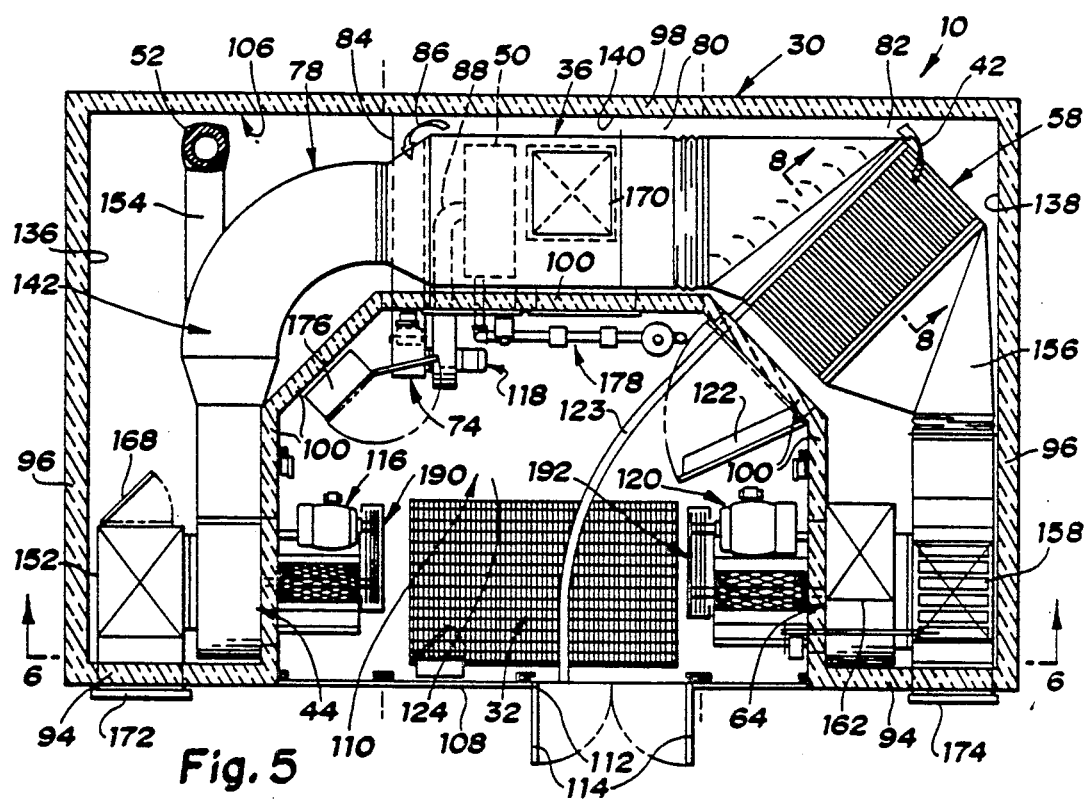
FIG. 5 is a plan view taken in section through the heater along the direction of line 5—5 in FIG. 1 to illustrate the heater construction adjacent its floor level.

As illustrated in FIGS. 3 and 5, the recirculating heating circuit 36 also includes a combustion blower 74 that draws air as shown by arrows 42 and 76 into the heating circuit 36 for combustion at the burner 50 as is more fully hereinafter described. Heating circuit 36 includes ductwork generally designated by 78 for preheating the air within the heater housing 30 prior to being moved through the second flow path 62 of the heat exchanger 58 for further heating. Thus, the flow of the air along this ductwork 78 prior to entering the heat exchanger provides greater efficiency in the entire heating process.

Figure 7:
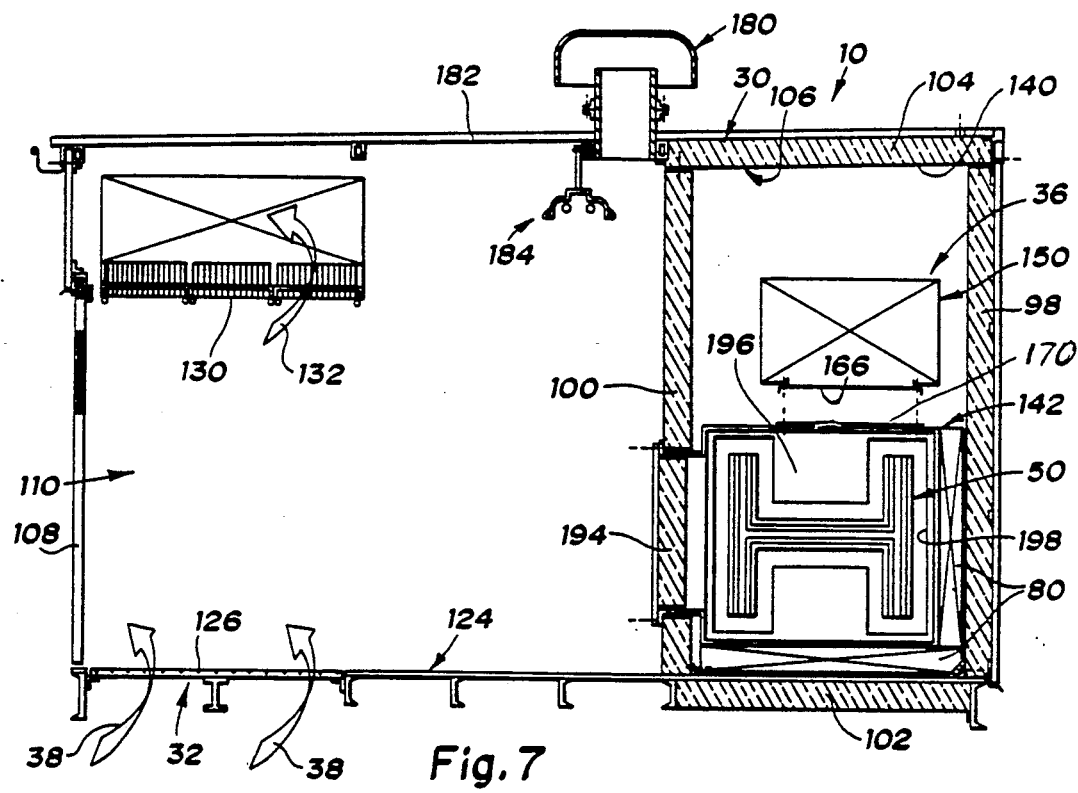
FIG. 7 is an elevational view taken in section through the heater along the direction of line 7—7 in FIG. 4 and also illustrates both the heating and control chambers of the heater.

As illustrated in FIGS. 3, 5 and 7, the heating circuit 36 also includes an inlet conduit 80 which is positioned as best illustrated in FIG. 7 between the burner 50 and the housing. More specifically, this inlet conduit 80 has an L-shaped cross section best shown in FIG. 7 extending along the outer side and bottom of the heating circuit adjacent the burner 50 so as to prevent concentration of the heat from the burner at the outer and lower sides of the housing. This inlet conduit 80 as shown in FIGS. 3 and 4 has an entry end 82 where the combustion air enters the heating circuit 36 adjacent the heat exchanger 58 as shown by arrow 66. Adjacent the burner 50 as illustrated in FIG. 5, the inlet conduit 80 has an exit end 84 where the combustion air turns at a right angle as illustrated by arrow 86 for flow to the combustion blower 74 and delivery therefrom through a feed conduit 88 to the burner 50 for combustion with gas supplied to the burner.

As illustrated in FIGS. 1, 2 and 4 through 6, the carbon desorption heater 10 includes a plurality of modules 90 connected to each other by unshown connectors at interfaces 92. Each of these heater modules 90 is sufficiently small so as to be shippable by commercial carrier, and the modules are securable to each other at the site where the heater is to be used, such that fabrication of the heater can be done prior to shipment to the use site for assembly. As illustrated, there are three of the heater modules 90; however, it should be appreciated that any number of the modules can be utilized depending upon the size of the heater and shipping size limitations.

As illustrated in FIGS. 4 through 7, the housing 30 includes insulated front walls 94, insulated side walls 96, an insulated rear wall 98 and insulated inner walls 100 that cooperate with an insulated floor 102 and an insulated ceiling 104 to define a heating chamber 106 in which the recirculating heating circuit 36 is located. Housing 30 also includes a front outer wall 108 that cooperates with the insulated inner walls 100 to define a control chamber 110 from which the heater is controlled by an operator. This outer wall 108 has an opening 112 that is selectively opened and closed by the doors 114 shown in FIGS. 1 and 5 so as to permit access through the opening into the control chamber. This control chamber 110 is maintained generally at ambient temperature to facilitate the operation of the heater while the heating chamber 106 is heated by the recirculating heating circuit 36 without substantial loss of heat due to the insulated wall construction of the heater as described above.

As illustrated best in FIG. 5, the heater blowers 44, 64, and 74 previously described have associated motors 116, 118 and 120, respectively, that are located within the control chamber 110 so as to be maintained generally at ambient temperature while having the necessary rotary and/or ductwork connections to the recirculating heating circuit 36 so as to permit the heating to be performed within the heating chamber 106 at its elevated temperature.

As best illustrated in FIGS. 4 and 5, one of the insulated inner walls 100 has an access door 122 for providing access from the control chamber 110 to the heat exchanger 58 within the heating chamber 106. This access door 122 is selectively opened and closed to provide the access for maintenance and repair of the heater exchanger 58 and to also isolate the heating and control chambers 106 and 110 during use of the heater. Furthermore, as shown in FIG. 5, the housing 30 also preferably includes a floor track 123 along which the heater exchanger 58 is moved from the heating chamber 106 through the control chamber 110 and out through the access door opening 112.

Figure 6:
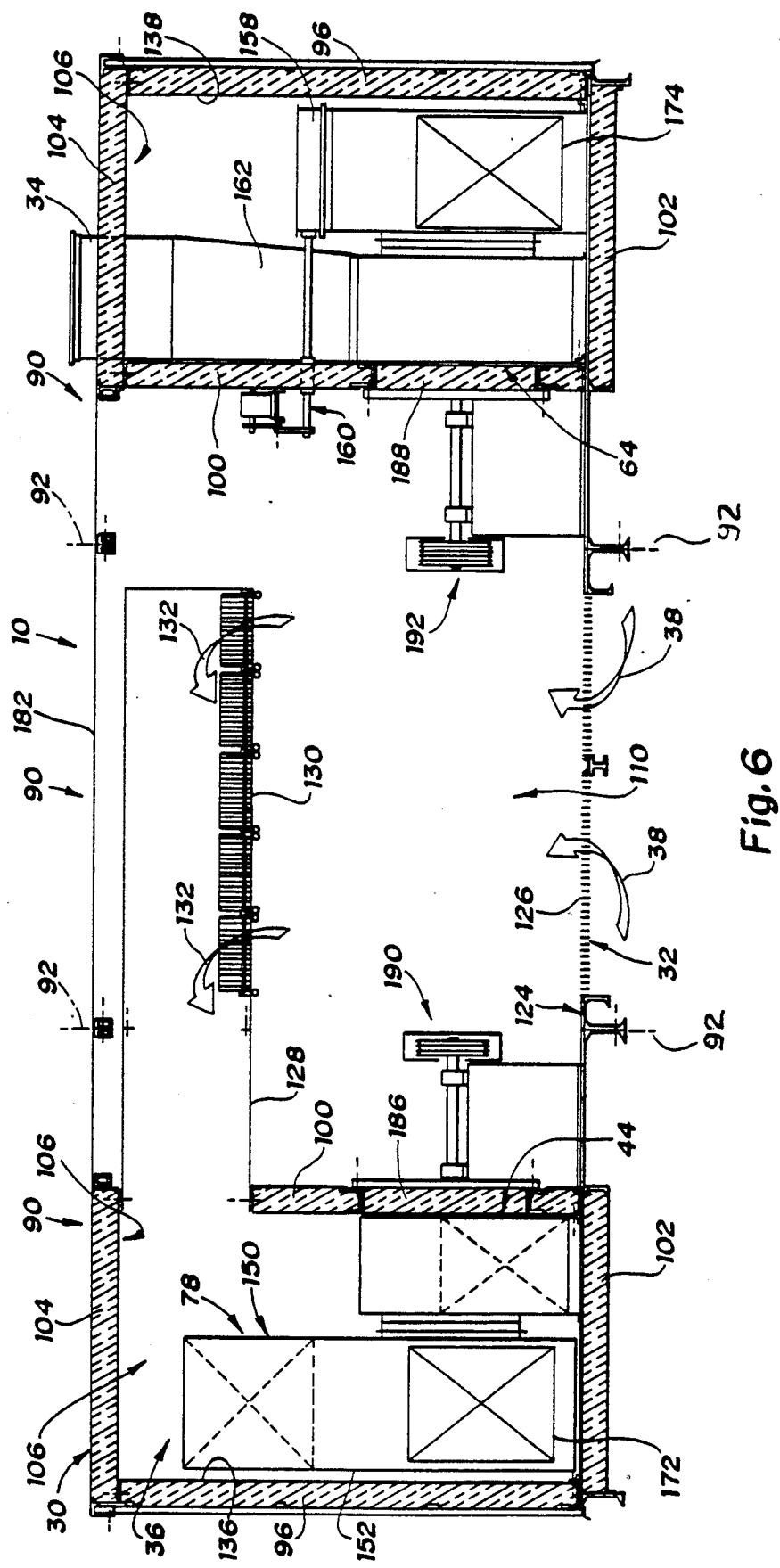
FIG. 6 is an elevational view taken in section through the heater along the direction of line 6—6 in FIG. 5 and illustrates both a heating chamber and a control chamber of the heater.

As illustrated by combined reference to FIGS. 6 and 7, the heater housing includes a control chamber floor 124 having a grate 126 that embodies the air inlet 32 through which the air enters the housing as illustrated by arrows 38 for the heating as previously described. Heater housing 30 also has its control chamber 110 provided with a ceiling 128 having a filter 130 through which air flows from the control chamber as shown by arrows 132 into the heating chamber 106 in which the recirculating heating circuit 36 is located. This air flows from the filter 130 as shown by arrows 132 toward the left and, as shown in FIG. 4, makes a right angle turn as shown by arrow 134 for flow along the ductwork 78 of the recirculating heating circuit, as was previously described, to provide the preheating of the air prior to entering the heat exchanger 58 for further heating and eventual delivery to the supply outlet 34.

As illustrated in FIGS. 4 through 7, the heating chamber 106 has a pair of spaced end portions 136 and 138 and a connecting portion 140 that connects the end portions to define a generally U-shaped configuration. This U-shaped configuration of the heating chamber defines a central portion in which the control chamber 110 is located. Thus, the insulated inner walls 100 extend along each end portion 136 and 138 and along the connecting portion 140 of the heating chamber so as to provide close proximity access to each portion of the heating chamber from the control chamber 110 for maintenance and operation of the heater.

Figure 8:
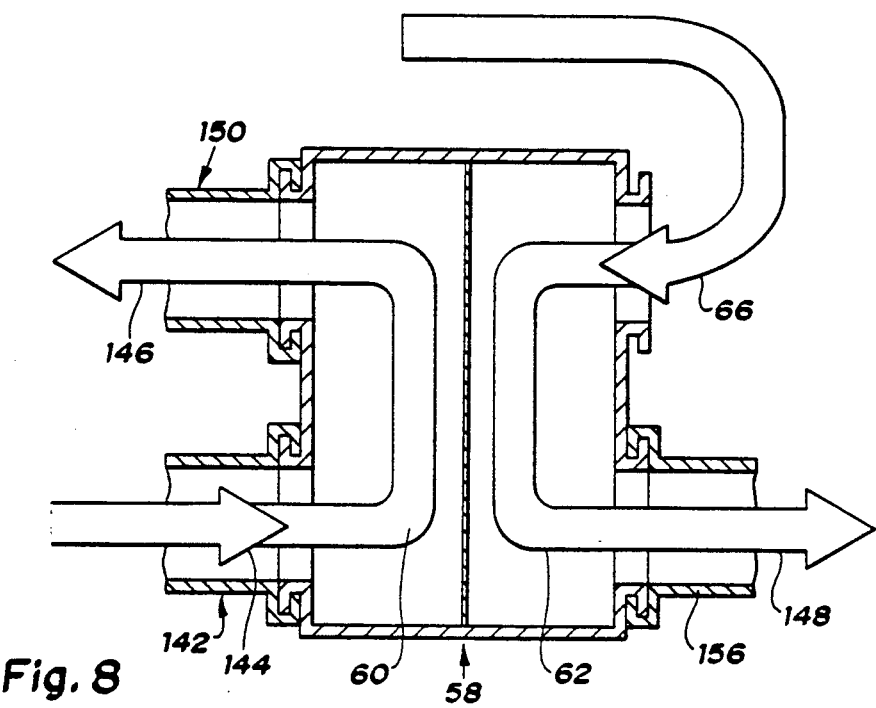
FIG. 8 is a schematic view illustrating the flow paths through a heat exchanger of the heater.

As best illustrated in FIG. 5, the recirculating heating circuit 36 has an L-shaped lower heating reach 142 that extends along the one end portion 136 of the heating chamber and along the connecting portion 140 of the heating chamber with the burner 50 located along this lower heating reach. The heat exchanger 58 as shown in FIGS. 4 and 5 is located at the junction of the other end portion 138 of the heating chamber and the connecting portion 140 of the heating chamber. As shown schematically in FIG. 8, the lower heating reach 142 extends as shown by arrow 144 to the heat exchanger 58 for flow of the heated air through the first flow path 60 of the heat exchanger in an upward direction and exits the air from the heat exchanger for return flow as shown by arrow 146. This upward flow of the heated air through a conventional indirect heat exchange operation provides heating of the second flow path 62 in which air preheated by the ductwork of the heating circuit is further heated after entry as shown by arrow 66 from the heating chamber into the heat exchanger and downward flow through the second flow path 62 prior to exiting as shown by arrow 148 for the delivery to the supply outlet as previously described.

As illustrated in FIG. 4, the heating circuit 36 also has an L-shaped upper return reach 150 that extends from the heat exchanger 58 along the connecting portion 140 of the heating chamber to the one end portion 136 so as to provide return of the recirculating air after its passage through the heat exchanger as previously described. At the one end portion 136 of the heating chamber as best illustrated in FIG. 6, the heating circuit 36 has a vertical connecting reach 152 through which the recirculated air flows downwardly from the upper return reach 150 to the lower heating reach 142 under the impetus of the blower 44 previously described. The exhaust stack 52 as shown in FIG. 5 has a connection 154 to the lower heating reach 142 of the heating circuit upstream from the burner 50 at the one end portion 136 of the heating chamber.

As illustrated by reference to FIG. 6, the supply outlet 34 and the delivery blower 64 are located within the end portion 138 of the heating chamber on the opposite side of the control chamber 110 from the heating chamber end portion 136 where the vertical reach 152 extends between the heating and return reaches 142 and 150. A delivery duct 156 provides a connection between the heated air received from the heat exchanger 58 for flow to the blower 64 and eventual delivery to the supply outlet 34. A damper 158 also illustrated schematically in FIG. 3 is located along the delivery duct 156 and provides control of the extent of heated air supplied from the heat exchanger 58 to the supply outlet by permitting introduction of less heated air within the heating chamber end portion 138 into the blower 64. This damper 158 is operated by a control assembly 160 that extends through the adjacent insulated wall 100 into the control chamber 110 for manual and/or automatic adjustment as necessary to maintain the desired temperature of the gas supplied to the outlet 34. Usually, this damper 156 is opened when the temperature of the heated air at supply outlet 34 is too high, and the air drawn in through the opened damper thus reduces the temperature at the supply outlet. A vertical duct 162 extends upwardly from the blower 64 within the heating chamber end portion 138 to the supply outlet 34 through which the heated air is supplied.

Within the heating chamber 106, the ductwork 78 of the recirculating heating circuit 36 includes access doors 164 and 166 as shown in FIG. 4 and access doors 168 and 170 as shown in FIGS. 5 and 7 for permitting necessary access to the interior of the heating circuit for cleaning and repair. Likewise, the housing 30 has access doors 172 and 174 as shown in FIGS. 1, 5 and 7 for providing access to the heating chamber end portions 136 and 138 respectively adjacent the recirculating blower 44 and the delivery blower 64 previously described.

Within the control chamber 110 where the blower motors 116, 118 and 120 are located as previously described, a control panel 176 is also provided as is a gas supply 178. As shown in FIGS. 1 and 7, a vent 180 is also provided on the housing roof 182 so as to provide ventilation within the control chamber 110, and a light fixture 184 is suspended from the roof 182 adjacent the vent and provides illumination within the control chamber 110.

As illustrated in FIG. 6, the insulated inner walls 100 have access doors 186 and 188 for permitting blower removal for maintenance and repair. These blowers are driven by their associated motors through belt and shaft drive assemblies 190 and 192 located within the control chamber 106.

As illustrated in FIG. 7, one of the insulated inner walls 100 has an access door 194 for providing access to the burner 50 along the lower heating reach 142 of the recirculating heating circuit 36. This burner 50 has an H-shaped construction and includes a profile plate 196 having an H-shaped opening 198 for restricting the air flow along heating reach 142 to adjacent the burner 50 in order to increase the efficiency of the burner flame heating the air.

While the best mode for practicing the invention has been described in detail, those familiar with the art to which this invention relates will recognize various alternative designs and embodiments for practicing the invention as defined by the following claims.

What is claimed is:

1. A carbon desorption heater for use in a system for removing volatile organic contaminants from a carbon filter, the heater comprising:
   a housing having an inlet for receiving air to be heated and also having a supply outlet through which heated air is supplied to the carbon filter;
   a recirculating heating circuit located within the housing, the heating circuit including a recirculation blower that moves air in a recirculating manner along the heating circuit and also including a burner that heats the air during its recirculating flow, and the heating circuit including an exhaust stack outlet through which a portion of the recirculating air is exhausted during each cycle of flow through the heating circuit;
   a heat exchanger located within the housing and having a first flow path that is heated by the recirculating heating circuit, and the heat exchanger having a second flow path that is heated by heat exchange with the first flow path; and
   a delivery blower within the housing for moving air through the second flow path of the heat exchanger for heating thereof and for supplying the heated air to the supply outlet of the housing.

2. A carbon desorption heater as in claim 1 wherein the recirculating heating circuit also includes a combustion blower that draws air into the heating circuit for combustion at the burner.

3. A carbon desorption heater as in claim 1 wherein the heating circuit includes ductwork that preheats the air within the housing prior to being moved through the second flow path of the heat exchanger for further heating.

4. A carbon desorption heater as in claim 1 wherein the heating circuit includes an inlet conduit positioned between the burner and the housing, and the heating circuit including a combustion blower that draws air into the heating circuit through the inlet conduit for combustion at the burner.

5. A carbon desorption heater as in claim 1 which includes a plurality of modules each of which is sufficiently small so as to be shippable by commercial carrier, and the modules being securable to each other at the site where the heater is to be used.

6. A carbon desorption heater as in any one of the preceding claims wherein the housing includes insulated walls that define a heating chamber in which the recirculating heating circuit and heat exchanger are located, the housing including an outer wall that cooperates with the insulated walls to define a control chamber, and said outer wall having an access opening through which the control chamber is accessible.

7. A carbon desorption heater as in claim 6 wherein each blower includes a drive motor located within the control chamber, one of the insulated walls having an access door for providing access to the heat exchanger from the control chamber, the housing including a control chamber floor having a grate that embodies the air inlet to the housing, and the housing including a control chamber ceiling having a filter through which the air passes upon flow from the inlet through the control chamber into the heating chamber in which the recirculating heating circuit is located.

8. A carbon desorption heater as in claim 7 wherein the heating chamber has a pair of spaced end portions and a connecting portion that connects the end portions to define a generally U-shaped configuration, and the U-shaped configuration of the heating chamber defining a central portion at which the control chamber is located.

9. A carbon desorption heater as in claim 8 wherein the recirculating heating circuit has an L-shaped lower heating reach that extends along one end portion of the heating chamber and along the connecting portion, the burner of the heating circuit being located along the lower heating reach, the heat exchanger being located at the junction of the other end portion and the connecting portion of the heating chamber with the lower heating reach of the heating circuit extending thereto, the heating circuit having an L-shaped upper return reach that extends from the heat exchanger along the connecting portion of the heating chamber to said one end portion thereof, and the heating circuit having a vertical connecting reach that connects the heating and return reaches at said one end portion of the heating chamber.

10. A carbon desorption heater as in claim 9 wherein the exhaust stack outlet has a connection to the lower heating reach of the heating circuit upstream from the burner and within the one end portion of the heating chamber.

11. A carbon desorption heater as in claim 10 wherein the supply outlet and delivery blower are located at the other end portion of the heating chamber.

12. A carbon desorption heater as in claim 11 further including a damper that controls the extent of heated air supplied from the second flow path of the heat exchanger to the supply outlet.

13. A carbon desorption heater as in claim 12 which includes a vertical outlet duct that extends upwardly from the delivery blower at said other end portion of the heating chamber to the supply outlet through which the heated air is supplied.

14. A carbon desorption heater for use in a system for removing volatile organic contaminants from a carbon filter, the heater comprising:
a housing having insulated walls that cooperate to define a heating chamber, said housing also having an inlet for receiving air to be heated and a supply outlet through which heated air is supplied to the carbon filter;
a recirculating heating circuit including ductwork located within the heating chamber of the housing, the heating circuit including a recirculation blower that moves air in a recirculating manner through the ductwork thereof and also including a burner that heats the air during its recirculating flow through the ductwork, and the heating circuit including an exhaust stack outlet through which a portion of the recirculating air is exhausted during each cycle of flow through the heating circuit;
a heat exchanger located within the heating chamber of the housing and having a first flow path that is heated by the recirculating heating circuit, and the heat exchanger having a second flow path that is heated by heat exchange with the first flow path; and
a delivery blower within the housing for moving air within the housing initially along the ductwork of the recirculating heating circuit for preheating and then through the second flow path of the heat exchanger for further heating thereof and for subsequent delivery of the heated air to the supply outlet of the housing.

15. A carbon desorption heater for use in a system for removing volatile organic contaminants from a carbon filter, the heater comprising:
a housing having insulated walls that cooperate to define a U-shaped heating chamber having spaced end portions and a connecting portion extending between the end portions, said housing having an outer wall that cooperates with the insulated inner walls to define a control chamber between the end portions of the heating chamber, and said housing also having an inlet for receiving air to be heated and a supply outlet through which heated air is supplied to the carbon filter;
a recirculating heating circuit including ductwork located within the U-shaped heating chamber of the housing, the heating circuit including heating and return reaches and having a recirculation blower that moves air in a recirculating manner along the heating circuit, the heating circuit including a burner that heats the air along the heating reach, the heating circuit including an inlet conduit and a combustion blower that draws air through the inlet conduit to the burner for combustion, and the heating circuit further including an exhaust stack outlet through which a portion of the recirculating air is exhausted during each cycle of flow through the heating circuit;
a heat exchanger located within the U-shaped heating chamber of the housing and having a first flow path that receives heated air from the heating reach of the recirculating heating circuit and feeds the air to the return reach of the heating circuit, and the heat exchanger having a second flow path that is heated by heat exchange with the first flow path; and
a delivery blower within the housing for moving air within the housing initially along the ductwork of the recirculating heating circuit for preheating and then through the second flow path of the heat exchanger for further heating thereof and for subsequent delivery of the heated air to the supply outlet of the housing.

* * * * *